(12) United States Patent
Satake et al.

(10) Patent No.: US 8,928,474 B2
(45) Date of Patent: Jan. 6, 2015

(54) CHARGE DISPLAY UNIT

(75) Inventors: Toshihide Satake, Chiyoda-ku (JP);
Akinobu Sugiyama, Chiyoda-ku (JP);
Hiroshi Fujioka, Chiyoda-ku (JP);
Takanori Matsunaga, Chiyoda-ku (JP);
Kouhei Mori, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 688 days.

(21) Appl. No.: 13/177,210

(22) Filed: Jul. 6, 2011

(65) Prior Publication Data
US 2012/0075090 A1 Mar. 29, 2012

(30) Foreign Application Priority Data

Sep. 28, 2010 (JP) .................. 2010-216380

(51) Int. Cl.
*B60Q 1/00* (2006.01)
*G07C 5/08* (2006.01)
*B60K 37/02* (2006.01)
*B60L 11/14* (2006.01)
*B60L 11/18* (2006.01)

(52) U.S. Cl.
CPC .............. *G07C 5/0825* (2013.01); *B60K 37/02* (2013.01); *B60L 11/14* (2013.01); *B60L 11/1816* (2013.01); *B60L 11/184* (2013.01); *B60L 11/1842* (2013.01); *B60L 11/1848* (2013.01); *B60L 11/185* (2013.01); *B60K 2350/1092* (2013.01); *B60L 2240/12* (2013.01); *B60L 2250/16* (2013.01); *Y02T 90/121* (2013.01); *Y02T 90/128* (2013.01); *Y02T 90/14* (2013.01); *Y02T 10/7077* (2013.01); *Y02T 10/7088* (2013.01); *Y02T 10/7005* (2013.01); *Y02T 90/169* (2013.01); *Y04S 10/126* (2013.01); *Y04S 30/14* (2013.01); *Y02E 60/721* (2013.01)

USPC ................. 340/455; 340/438; 340/425.5

(58) Field of Classification Search
CPC .. B60Q 1/00; B60W 2050/146; B60W 10/26; B60W 2710/244
USPC ........................ 340/455, 438, 425.5
See application file for complete search history.

(56) References Cited

U.S. PATENT DOCUMENTS

| 8,164,301 B2 * | 4/2012 | Uchida .......................... 320/109 |
| 2010/0102776 A1 * | 4/2010 | Uchida .......................... 320/109 |

(Continued)

FOREIGN PATENT DOCUMENTS

| CN | 201355771 U | 12/2009 |
| CN | 201498568 U | 6/2010 |

(Continued)

OTHER PUBLICATIONS

Notification of Reason(s) for Refusal, Patent Application No. 2010-216380, May 30, 2013, reference No. 613327JP01; dispatch No. 355565.

(Continued)

*Primary Examiner* — Kerri McNally
*Assistant Examiner* — Kam Ma
(74) *Attorney, Agent, or Firm* — Sughrue Mion, PLLC; Richard C. Turner (57) ABSTRACT

A charged-amount display part displays a battery charge rate of an entire battery pack according to kinds of charge sources. An example of displaying the battery charge rate in the form of a bar chart is shown. A speed display part displays a vehicle speed of a running electric vehicle. The running cost display part displays a running cost calculated based on consumed electric power of the battery.

6 Claims, 5 Drawing Sheets

(56) References Cited

U.S. PATENT DOCUMENTS

| | | | |
|---|---|---|---|
| 2010/0241339 A1* | 9/2010 | Proietty et al. | 701/109 |
| 2011/0010030 A1* | 1/2011 | Yamamoto | 701/22 |
| 2011/0175569 A1* | 7/2011 | Austin | 320/109 |
| 2011/0191266 A1* | 8/2011 | Matsuyama | 705/412 |
| 2011/0320117 A1* | 12/2011 | Sempuku et al. | 701/201 |
| 2012/0075090 A1* | 3/2012 | Satake et al. | 340/455 |
| 2012/0290506 A1* | 11/2012 | Muramatsu et al. | 705/412 |

FOREIGN PATENT DOCUMENTS

| | | | |
|---|---|---|---|
| GB | 2466561 A | | 6/2010 |
| JP | 2007-237792 A | | 9/2007 |
| JP | 2009-035049 A | | 2/2009 |
| JP | 2009035049 A | * | 2/2009 |
| JP | 2009-055675 A | | 3/2009 |
| JP | 2009-241926 A | | 10/2009 |
| JP | 2009241926 A | * | 10/2009 |
| JP | 2010-149553 A | | 7/2010 |
| JP | 2011-098693 A | | 5/2011 |

OTHER PUBLICATIONS

Japanese Office Action (Decision of Refusal), issued Nov. 6, 2013, Patent Application No. 2010-216380.

Chinese Office Action (First Office Action), issued Oct. 21, 2013, Patent Application No. 201110222886.0.

Notification of Reason(s) for Refusal, Patent Application No. 2010-216380, Jan. 31, 2013, reference No. 613327JP01; dispatch No. 067061.

Japanese Office Action, issued Sep. 9, 2013, Patent Application No. 2012-195709.

Notification of Reason(s) for Refusal, reference No. 613327JP01; dispatch No. 464045, Jul. 10, 2012.

Chinese Office Action issued in Chinese Application No. 201110222886.0 dated May 23, 2014.

* cited by examiner

CHARGE DISPLAY UNIT

BACKGROUND OF THE INVENTION

1. Field of the Invention

The present invention relates to a charge display unit of an electric vehicle, and particularly to a charge display unit of an electric vehicle charged by a plurality of charge sources.

2. Description of the Background Art

Today, in an electric vehicle which uses electric power charged in a battery as a drive source for driving a motor to thereby obtain power, the battery can be charged by a household power supply through a cable. In recent years, more and more homes employ private power generation using photovoltaic power generation or wind power generation. In a case where the homes have any surplus electric power, the surplus electric power is sold to an electric power company, and in a case where the amount of power generation is insufficient, the homes use commercial electric power (system electric power) supplied from an electric power supply system of an electric power company. Advanced version of such a system is a next-generation electric power network called a smart grid.

In the current situation where homes are introducing electric power supply based on private power generation, when a battery of an electric vehicle is charged by a household power supply, there are cases where the charged electric power is obtained by photovoltaic power generation or wind power generation and where the charged electric power is obtained by an electric power supply system. Even in the case of the system electric power, the price varies between day and night. Thus, there are cases of normal system electric power and night system electric power. Additionally, in a case of quick charge, the charge may be performed in a quick charger by paying an additional fee.

In this manner, in an electric vehicle (including a plug-in hybrid vehicle which uses both of a gasoline engine and a motor), electric power is charged by a plurality of supply sources, and the running cost varies depending on which of the supply sources is selected. The running cost of an electric vehicle is represented by, for example, the term "electricity cost", which is, similarly to the fuel cost in a gasoline vehicle, a matter of concern to a user.

However, in a conventional electric vehicle as disclosed in Japanese Patent Application Laid-Open No. 2010-149553 (FIG. 2) for example, although a display of a battery charge state has been proposed, no display of the running cost such as the electricity cost has not been proposed.

SUMMARY OF THE INVENTION

An object of the present invention is to provide a charge display unit that allows a user of an electric vehicle to recognize the running cost.

In a first aspect of the present invention, a charge display unit is a charge display unit of a vehicle traveling by means of a motor being driven by using electric power charged in a battery as a drive source, the charge display unit including a charged-amount display part that displays the charged amount in such a manner that in a case where the battery is charged by a plurality of charge sources, the charged amounts charged by the respective charge sources can be separately displayed.

In the charge display unit according to the first aspect, by seeing the charged-amount display part, a user of the vehicle can recognize the charge source performing charging and the degree of the charging performed. Thus, a cost-conscious operation can be performed. For example, if a charge source having a higher cost occupies a large proportion, a charge source having a lower cost is preferentially used for next charging.

In a second aspect of the present invention, a charge display unit is a charge display unit of a vehicle that travels by means of a motor being driven by using electric power charged in a battery as a drive source, the charge display unit including a running cost display part that displays a running cost calculated based on electric power of the battery consumed by running and an electric power cost of a charge source charging the battery.

In the charge display unit according to the second aspect, by seeing the running cost display part, a user of the vehicle can drive the vehicle with awareness of the running cost.

These and other objects, features, aspects and advantages of the present invention will become more apparent from the following detailed description of the present invention when taken in conjunction with the accompanying drawings.

EMBODIMENT FOR CARRYING OUT THE INVENTION

<Preferred Embodiment>

Figure 1:
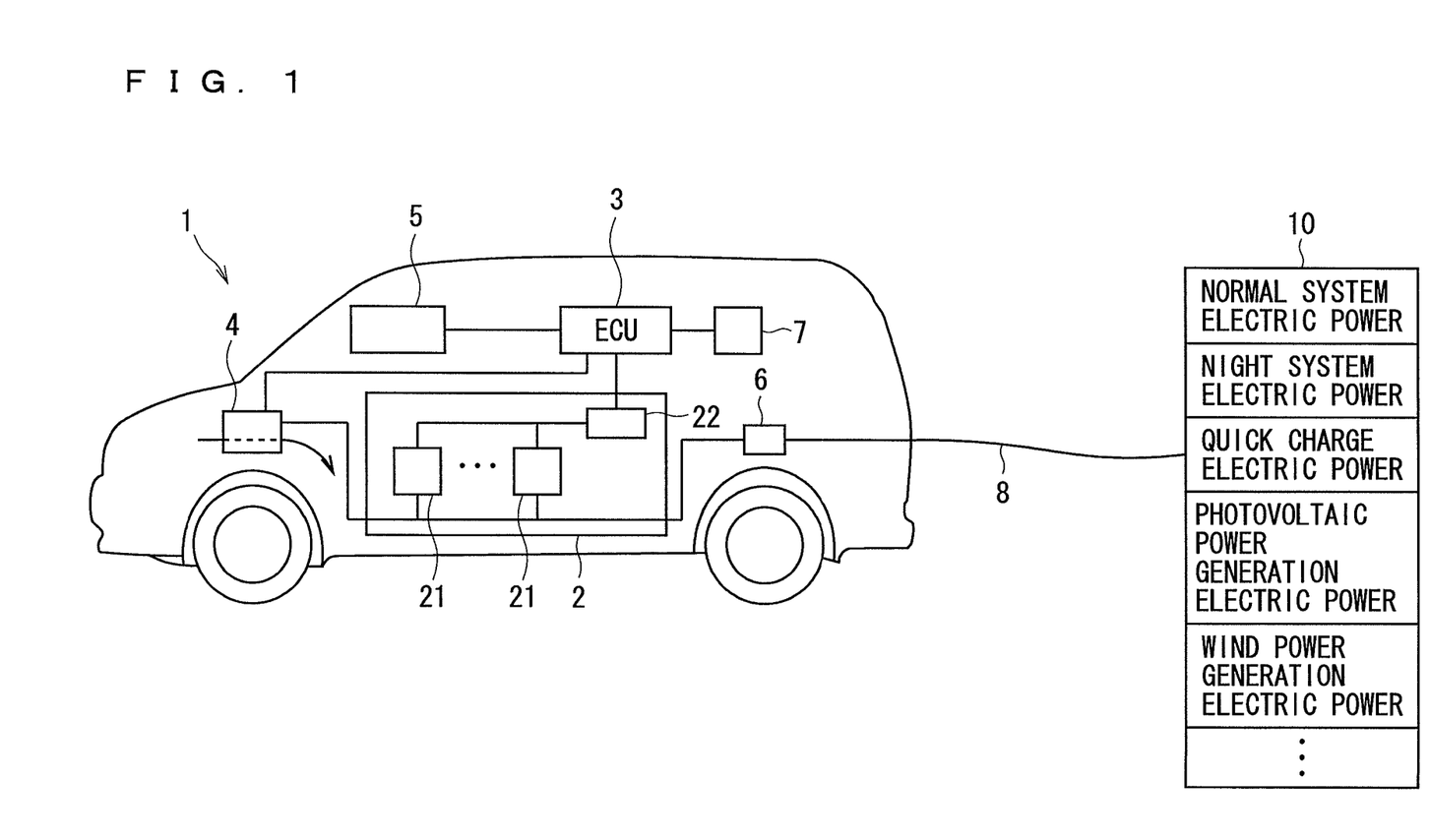
FIG. 1 is a diagram schematically showing a configuration of parts of an electric vehicle related to the present invention.

FIG. 1 is a diagram schematically showing a configuration of parts related to the present invention, in an electric vehicle including a charge display unit according to a preferred embodiment.

As shown in FIG. 1, an electric vehicle 1 includes a battery pack 2, an electronic control unit (ECU) 3, a regenerative electric power generation section 4, a charge display unit 5, a built-in charger 6, a charge-source-type determination section 7, and an electric power cable 8. The battery pack 2 serves as an electric power source of a motor (not shown), or the like, that supplies power to the electric vehicle 1. The ECU 3 controls the whole of the electric vehicle 1. The regenerative electric power generation section 4 generates regenerative electric power at a time of a braking operation.

The battery pack 2 has a plurality of battery cells 21 and a battery manager 22. The battery manager 22 manages a charge state of the plurality of battery cells 21, and gives information about a charge rate of the entire battery pack 2 and the like, to the electronic control unit 3.

Each of the battery cells 21 stores electric power for driving the electric vehicle 1, and is connected to the built-in charger 6. The built-in charger 16 is connected to an external power supply 10 such as a household power supply, via the electric power cable 8.

Various kinds of electric power obtained from different supply sources are supplied from the external power supply 10. The various kinds of electric power include, for example, normal system electric power and night system electric power obtained from an electric power supply system of an electric power company, quick charge electric power obtained from a quick charger with an additional fee, and photovoltaic power generation electric power and wind power generation electric power obtained privately at home. The charge-source-type determination section 7 determines what kind of electric power is being supplied at a time of charging, and gives information about it to the ECU 3.

The ECU 3 receives the information about the charge rate of the entire battery pack 2 from the battery manager 22 and the information about a kind of the charge source from the charge-source-type determination section 7, and matches them with the information about the charge rate (remaining charge) of the entire battery pack 2. Thereby, the ECU 3 can recognize the kind of the charge source performing charging and the degree of the charging performed. Then, the ECU 3 displays a result of the recognition on the charge display unit 5.

In the electric vehicle 1, for braking, regenerative braking is performed. At that time, the regenerative electric power generation section 4 causes regenerative electric power and stores it in the battery pack 2. This regenerative electric power is also a kind of the supply source. In storing the regenerative electric power, information thereof is given to the ECU 3, and matched with the information about the charge rate of the entire battery pack 2, so that the degree of charging performed by the regenerative electric power can be recognized.

In a case where the electric power in the battery is consumed by running of the electric vehicle 1, a running cost is calculated based on cost data of each charge source, and a result of the calculation is displayed on the charge display unit 5.

Figure 2:
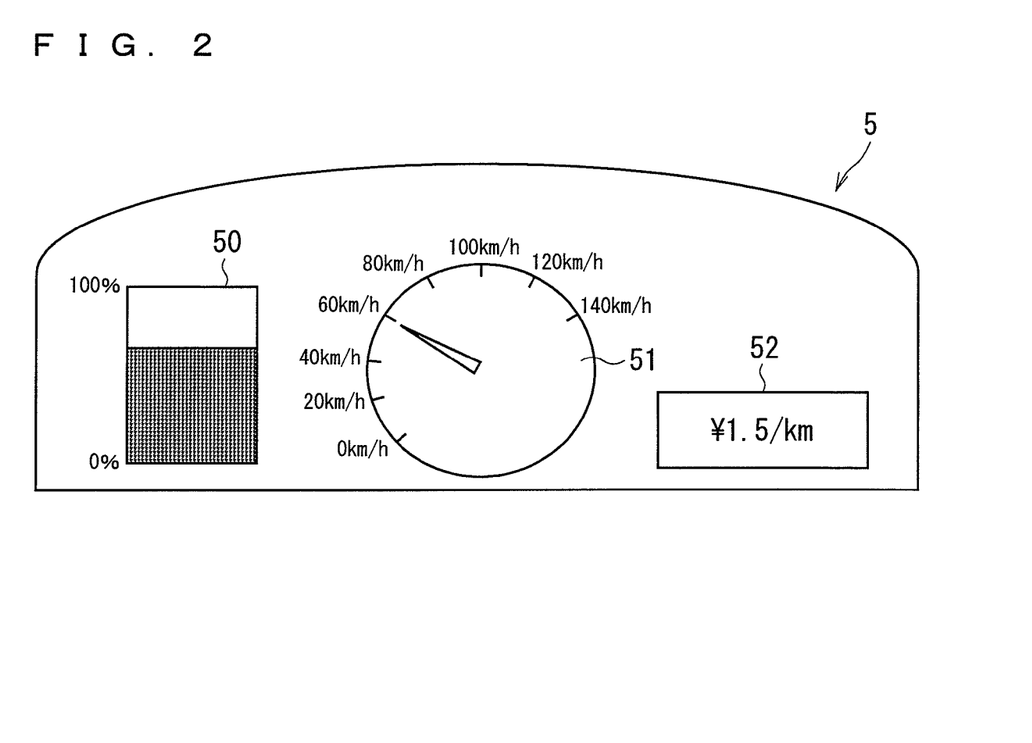
FIG. 2 is a diagram showing a configuration of a charge display unit according to the present invention.

FIG. 2 is a diagram showing a configuration of the charge display unit 5 according to the present invention. The charge display unit 5 has a charged-amount display part 50, a speed display part 51, and a running cost display part 52.

The charged-amount display part 50 displays the battery charge rate of the entire battery pack 2 for the respective kinds of charge sources. In an example illustrated herein, the battery charge rate is displayed in the form of a bar chart. The speed display part 51 displays a vehicle speed of the running electric vehicle 1. The running cost display part 52 displays the running cost that is calculated based on battery electric power consumed by the running.

The charge display unit 5 is formed by using a liquid crystal display (LCD) or an organic EL display (Organic Electro-Luminescence Display). The charged-amount display part 50 can display the kinds of charge sources in a color-coded manner.

If a key switch is in an accessory power supply (ACC) ON position, the charge display unit 5 is displayed even while the electric vehicle 1 is not running.

Although in FIG. 2, the charge display unit 5 includes the speed display part 51, the speed display part 51 may not be included.

Next, an example of a charged-amount display in the charged-amount display part 50 will be described with reference to FIGS. 3 to 5.

Figure 3:
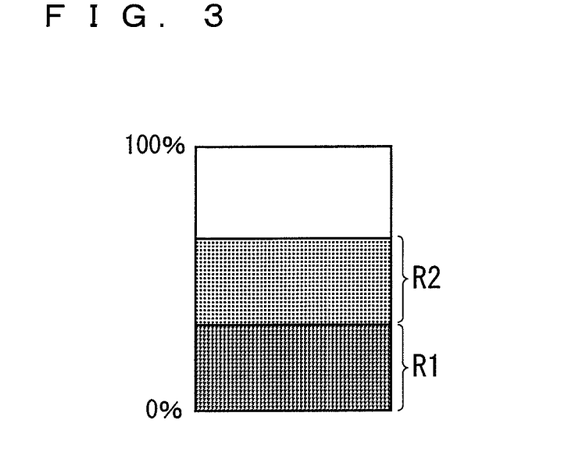
FIG. 3 shows an example of charging of a battery.

FIG. 3 shows a case where the battery pack 2 is charged by the normal system electric power and the night system electric power. In the charged-amount display part 50 having a rectangular shape, kinds of charge sources are separately indicated in the form of a bar chart.

To be specific, in a charge rate of approximately 60%, the lower half defines a region R1 indicating a charge made by the normal system electric power, and the upper half defines a region R2 indicating a charge made by the night system electric power.

Figure 4:
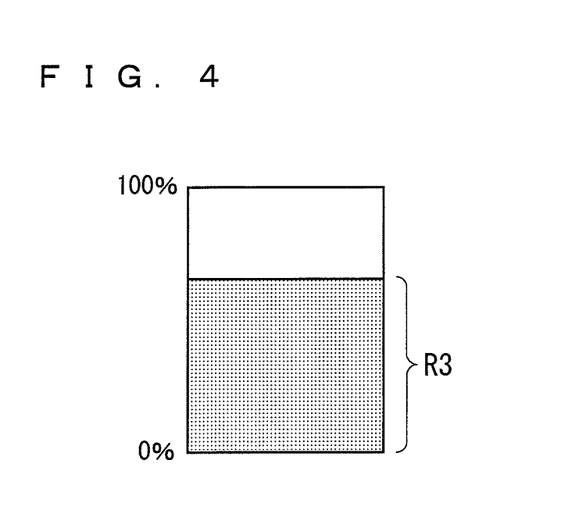
FIG. 4 shows an example of charging of the battery.

FIG. 4 shows a case where the battery pack 2 is charged by the photovoltaic power generation electric power. In a charge rate of approximately 60%, a whole thereof defines a region R3 indicating a charge made by the photovoltaic power generation electric power.

Figure 5:
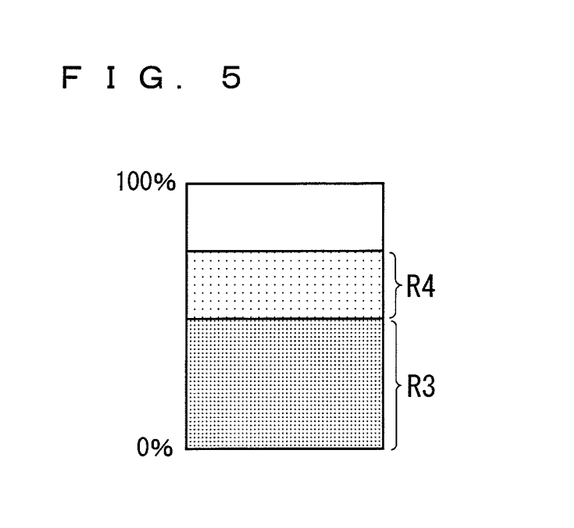
FIG. 5 shows an example of charging of the battery.

FIG. 5 shows a case where the battery pack 2 is charged by the photovoltaic power generation electric power and the regenerative electric power. In a charge rate, 50% defines the region R3 indicating a charge made by the photovoltaic power generation electric power, and 20% defines a region R4 indicating a charge made by the regenerative electric power.

Many methods are conceivable for determining the kind of a charge source at the time of charging. In a smart grid, a communication function called a smart meter, or a highly-functional electric power meter that manages other devices is used. In a case where input/output of electric power is managed via the smart meter, it is easy to grasp which charge source is used for the outputted electric power, that is, for the electric power charged to the battery pack 2, and information thereof can be transmitted to the charge-source-type determination section 7 via wire communication or wireless communication. Using the smart meter enables no system electric power to be used but only the electric power of private power generation such as photovoltaic power generation electric power and wind power generation electric power to be used as the charge source.

In a case where the electric power of the private power generation is used, an electric power cost is zero yen. The charge-source-type determination section 7 receives from the smart meter information indicating that the charge source is electric power of the private power generation, and gives to the ECU 3 default information indicating that the electric power cost is zero yen, for example.

In a case where the system electric power is charged, the smart meter gives information about a system electric power fee to the charge-source-type determination section 7, and gives information about the electric power cost to the ECU 3 via the charge-source-type determination section 7.

In a case of charging using the quick charger with an additional fee, the fee is charged in using of the quick charger. Thus, information of the fee is given to the charge-source-type determination section 7, and information about the electric power cost is given to the ECU 3 via the charge-source-type determination section 7.

In an exemplary display shown in FIGS. 3 to 5, if the charge is based on a plurality of charge sources, a charge source having a higher electric power cost is display at a lower position. This allows a user to easily recognize the levels of the electric power costs.

For facilitating the recognition furthermore, a charge source having a higher electric power cost may be displayed with a darker color (such as black or red) while a charge source having a lower electric power cost may be display with a brighter color (such as yellow or orange).

Instead of using many colors, shading of a single color may be used for the display. In such a case, for example, a charge source having an electric power cost may be displayed with a higher level of shading while a charge source having a lower electric power cost may be display with a lower level of shading. This makes the display simple and easy to see.

Figure 6:
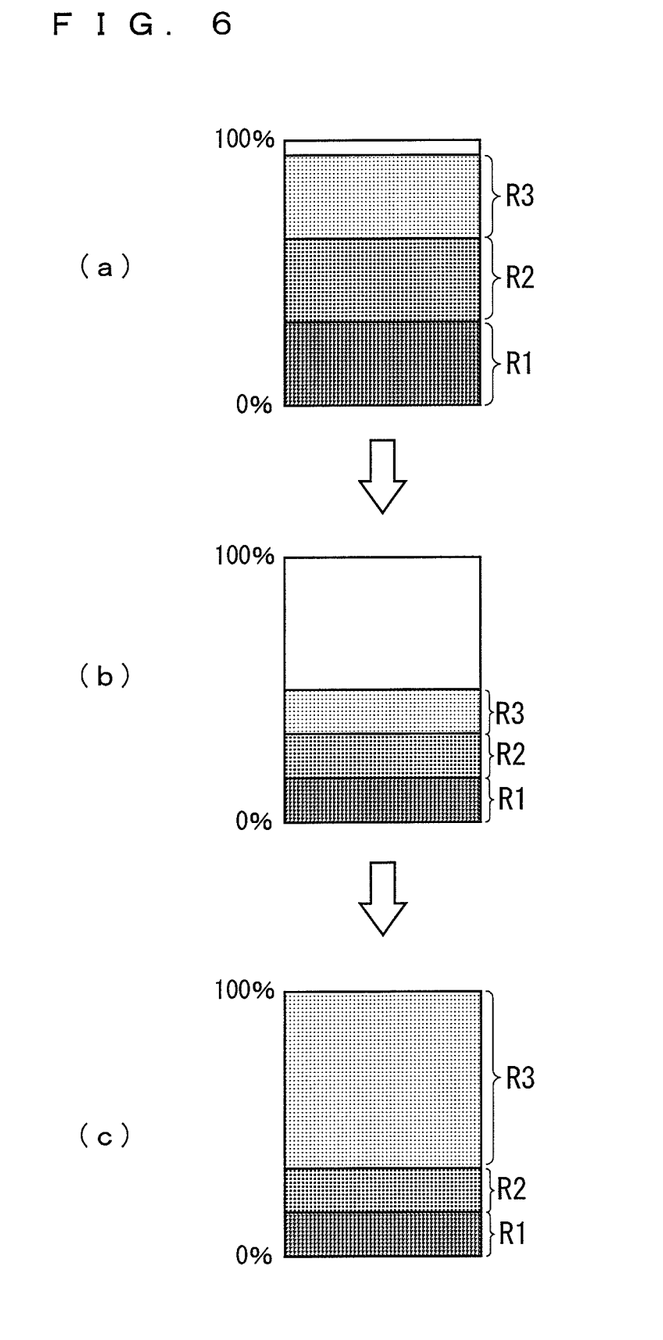
FIG. 6 is a diagram for explaining a change of a display of the charged-amount in a charged-amount display part.

A change of the charged-amount display in the charged-amount display part 50 will be described with reference to FIG. 6. A part (a) of FIG. 6 shows the charged-amount display part 50 before the electric vehicle 1 runs. In this example, the battery pack 2 is charged by the normal system electric power (region R1), the night system electric power (region R2), and the photovoltaic power generation electric power (region R3).

The charged amounts of the respective kinds of electric power are approximately equal to one another, and totally form a charge rate of substantially 100%.

A part (b) of FIG. 6 shows the charged-amount display part 50 in a case where the charged amount of the battery pack 2 is reduced as a result of running of the electric vehicle 1. In a display of this example, the charged amounts are reduced based on the assumption that the kinds of electric power of the respective charge sources are consumed at the same rate.

In this state, the electric vehicle 1 is stopped, and charging is performed only by the charge source of the photovoltaic power generation electric power. A part (c) of FIG. 6 shows the charged-amount display part 50 in this case. In the part (c) of FIG. 6, since the charging is performed by the photovoltaic power generation electric power, only the region R3 indicating the charge made by the photovoltaic power generation electric power is increased while the regions R1 and R2 are not changed.

In this manner, in a case where the electric power of the battery pack 2 is consumed, the display is performed such that the charged amounts of all the kinds of charge sources can be reduced at the same rate. In a case where the battery pack 2 is charged, the display is performed such that only a power supply serving for the charging can be increased.

This allows the user of the electric vehicle 1 to recognize the kind of the charge source performing charging and the degree of the charging performed, by seeing the charged-amount display part 50. Thus, a cost-conscious operation can be performed. For example, if a charge source having a higher cost occupies a large proportion, the photovoltaic power generation electric power is preferentially used for next charging.

Since the running cost display part 52 displays the running cost (yen/km) that has been calculated by the ECU 3 based on the electric power consumption and a running distance, the user of the electric vehicle 1 can drive the electric vehicle 1 with awareness of the running cost.

The running cost can be calculated by multiplying the amount of consumed electric power (kWh) of a charge source by the electric power cost (yen/kWh) of the charge source, and dividing a resultant value by the running distance (km). If there are a plurality of kinds of charge sources, the sum of values obtained by multiplying the amounts of consumed electric power (that are calculated based on the assumption that they are consumed at the same rate) of the charge sources by the electric power costs of the charge sources, respectively is divided by the running distance (km).

In the example of FIG. 6, the electric power cost of the photovoltaic power generation electric power is zero yen, and therefore it suffices that the electric power costs of only the normal system electric power and the night system electric power are considered.

The information about the electric power cost and the information about the charged amount charged by each charge source are also given to the ECU 3. By utilizing them, not only the running cost but also an electricity cost, an average cost of the current charge electric power, and the like, can be calculated. The display of the running cost display part 52 may be switched to a display of these calculated values.

For example, a cost (yen) of the current charge electric power can be calculated by summing values obtained by multiplying the charged amounts (kWh) of the charge sources by the electric power costs (yen/kWh) of the charge sources, respectively. By dividing the whole of the current charge electric power by the calculated cost of the current charge electric power, the average cost (kWh/yen) of the current charge electric power can be calculated. In this case, the more the electric power having a low electric power cost, such as the photovoltaic power generation electric power, is included, the larger the obtained value becomes, which means a better cost performance. This is the same concept as the "fuel cost", to provide a user-friendly display.

The running cost represented on a km/yen basis can be calculated by dividing a running distance (km) by a value obtained as a result of multiplying the amount of consumed electric power (kWh) of a charge source by an electric power cost (yen/kWh) of the charge source. In this case, a larger value displayed means a better cost performance. This is the same concept as the "fuel cost", to provide a user-friendly display.

Allowing a display on the running cost display part 52 to be switched between the running cost on a yen/km basis and the running cost on a km/yen basis expands user's selection.

It may be also acceptable that, instead of using the running distance (km), a value (yen) obtained by multiplying the amount of consumed electric power (kWh) of a charge source by an electric power cost (yen/kWh) of the charge source is accumulated and displayed as the running cost. In this case, the running cost can be recognized more directly.

A so-called "electricity cost" represented on a km/kWh basis can be calculated by dividing the running distance (km) by the amount of consumed electric power (kWh) of a charge source. In some countries, the inverse thereof is called the "electricity cost". If either one of them can be displayed on the running cost display part 52, it is available all over the world.

<Modification 1>

The charged-amount display part 50 shown in FIG. 2 has a rectangular shape, in which the kinds of charge sources are separately indicated in the form of a bar chart. Instead, a charged-amount display part 50A shown in FIG. 7 is also acceptable in which the kinds of charge sources are separately indicated in the form of a pie chart.

Figure 7:
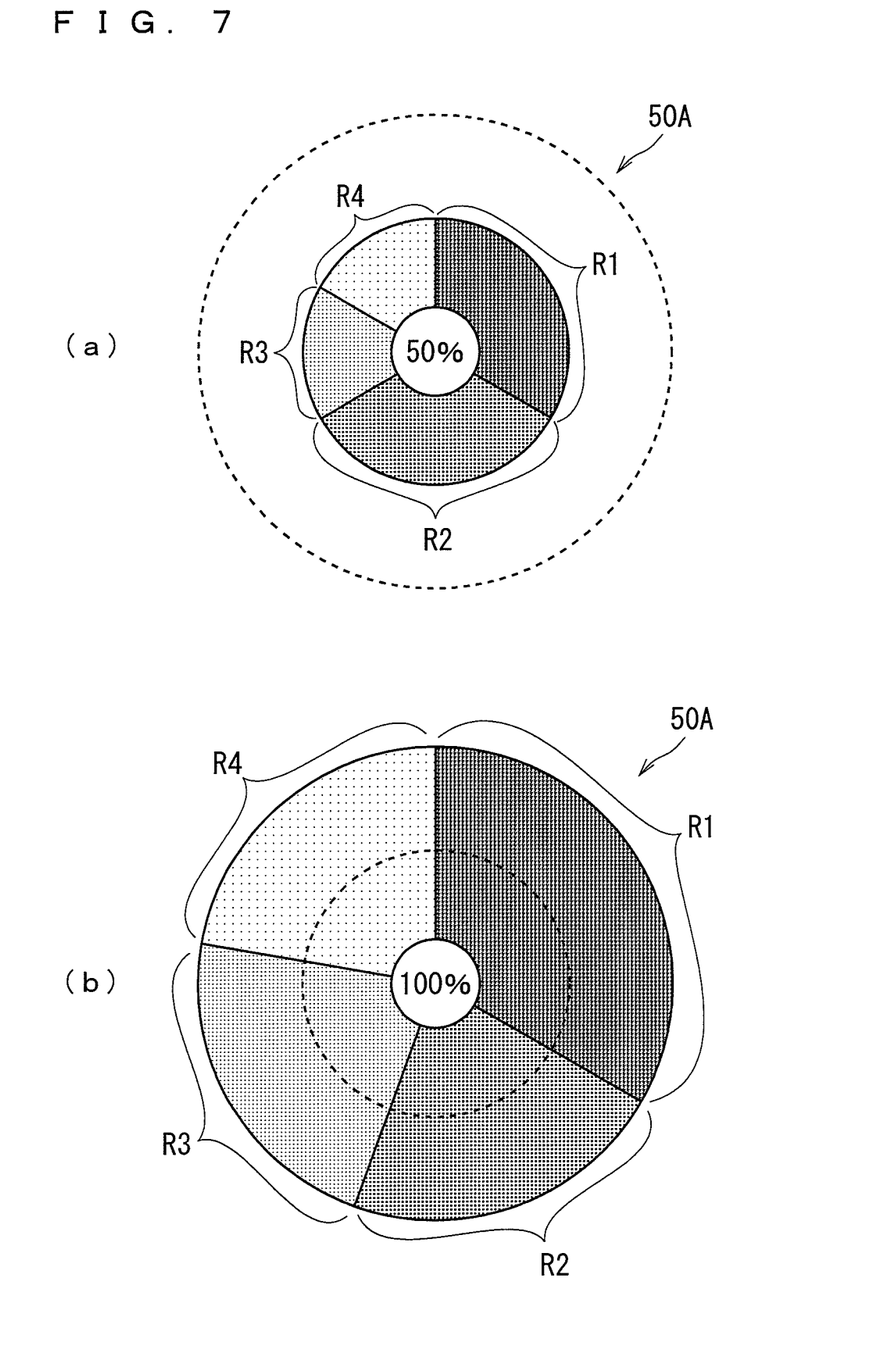
FIG. 7 is a diagram showing a configuration of a charged-amount display part according to a modification.

A part (a) of FIG. 7 shows the charged-amount display part 50A in a case where the charge rate is 50%. A part (b) of FIG. 7 shows the charged-amount display part 50A in a case where the charge rate is 100%. The charge rate is expressed by varying the diameter of the pie. Using a pie chart offers an advantage that a proportion of each charge source is easy to grasp.

Needless to say, although FIG. 7 shows only the two cases where the charge rate is 50% and 100%, any percentage from 0% to 100% may be displayed.

<Modification 2>

In the example described above, the present invention is applied to an electric vehicle. The present invention is also applicable to a plug-in hybrid vehicle using both of a gasoline engine and a motor. In a case of a series-hybrid vehicle which generates electric power by a gasoline engine and stores the electric power in a battery so that the series-hybrid vehicle travels by means of a motor being driven by the stored electric power. The electric power generated by gasoline can serve as one of charge sources. If a price of the gasoline is known, an electric power cost of the electric power generated by the gasoline can be calculated, thus the gasoline can be handled similarly to the other charge sources.

This allows application of the present invention to the plug-in hybrid vehicle.

Here, information about the price of the gasoline may be inputted by a user through an input section prepared in advance.

<Modification 3>

In the above description, the charge display unit 5 displays values of the costs such as the running cost and the electricity cost. The charge display unit 5 may have a display part that calculates and displays the amount of carbon dioxide ($CO_2$) emission.

Although an electric vehicle emits no $CO_2$ for driving, some charge sources emit $CO_2$ for generating electric power.

Thus, information about the amount of $CO_2$ emission of each charge source is obtained in advance, and a $CO_2$ emission display part is provided for converting the electric power consumption into the amount of $CO_2$ emission involved in running and display the amount of $CO_2$ emission.

More specifically, the amount of consumed electric power (kWh) of a charge source is multiplied by the amount of $CO_2$ (cc/kWh) emitted at the time when electric power is generated by the charge source, and a resultant value is divided by a running distance (km), to thereby calculate the amount of $CO_2$ emission involved in running In a case where there are a plurality of kinds of charge sources, the sum of values obtained by multiplying the amounts of consumed electric power of the respective charge sources by the amount of $CO_2$ emitted at the time of electric power generation is divided by a running distance (km).

Such a display enables the user to recognize the amount of $CO_2$ emission and therefore to be more conscious of running with a smaller amount of $CO_2$ emission.

While the invention has been shown and described in detail, the foregoing description is in all aspects illustrative and not restrictive. It is therefore understood that numerous modifications and variations can be devised without departing from the scope of the invention.

What is claimed is:

1. A charge display unit of a vehicle traveling by means of a motor being driven by using electric power charged in a battery as a drive source,
    said charge display unit comprising a charged-amount display part that displays the charged amount in such a manner that in a case where said battery is charged by a plurality of charge sources, the charged amounts charged by the respective charge sources can be separately displayed according to a corresponding electric power cost thereof, wherein
    said charged-amount display part displays the charged amount in such a manner that the area of a display region corresponding to, among said plurality of charge sources, a charge source charging said battery can be increased, and wherein
    in a case where electric power of said battery charged by a plurality of charge sources is consumed, said charged-amount display part displays the charged amount in such a manner that the areas of display regions corresponding to said respective charge sources can be decreased at the same rate as that of the consumed electric power.

2. The charge display unit according to claim 1, wherein
    in a case where said battery is charged by a plurality of charge sources, said charged-amount display part sequentially arranges display regions in the order of electric power costs of said respective charge sources.

3. The charge display unit according to claim 1, wherein
    in a case where said battery is charged by a plurality of charge sources, said charged-amount display part displays the charged amount in such a manner that display regions can be gradually shaded in the order of electric power costs of said respective charge sources.

4. The charge display unit according to claim 1, wherein
    said vehicle includes a hybrid vehicle that generates electric power by an engine and stores the generated electric power in said battery,
    the electric power generated by said engine serves as one of charge sources.

5. A charge display unit of a vehicle that travels by means of a motor being driven by using electric power charged in a battery as a drive source,
    said charge display unit comprising a running cost display part that displays a running cost calculated based on electric power of said battery consumed by running and an electric power cost of a charge source charging said battery, wherein
    said running cost display part switchably displays a first value and a second value as said running cost, said first value being obtained as a result of dividing, by a running distance, a value obtained by multiplying said electric power cost by electric power consumption corresponding to said charge source charging said battery, said second value being obtained as a result of dividing a running distance by a value obtained by multiplying said electric power cost by electric power consumption corresponding to said charge source charging said battery.

6. A charge display unit of a vehicle that travels by means of a motor being driven by using electric power charged in a battery as a drive source,
    said charge display unit comprising a running cost display part that displays a running cost calculated based on electric power of said battery consumed by running and an electric power cost of a charge source charging said battery, wherein
    in a case where said battery is charged by a plurality of charge sources, said running cost display part displays an average cost of current charge electric power as said running cost, said average cost of current charge electric power being obtained as a result of dividing, entire electric power charged in said battery, by the sum of values obtained by multiplying charged amounts charged by said charge sources by said electric power costs of said charge sources, respectively.

* * * * *